Sept. 1, 1942. F. C. WEDLER 2,294,642
APPARATUS FOR SPREADING AND STRETCHING FABRICS IN TUBULAR FORM
Filed May 20, 1941 2 Sheets-Sheet 1
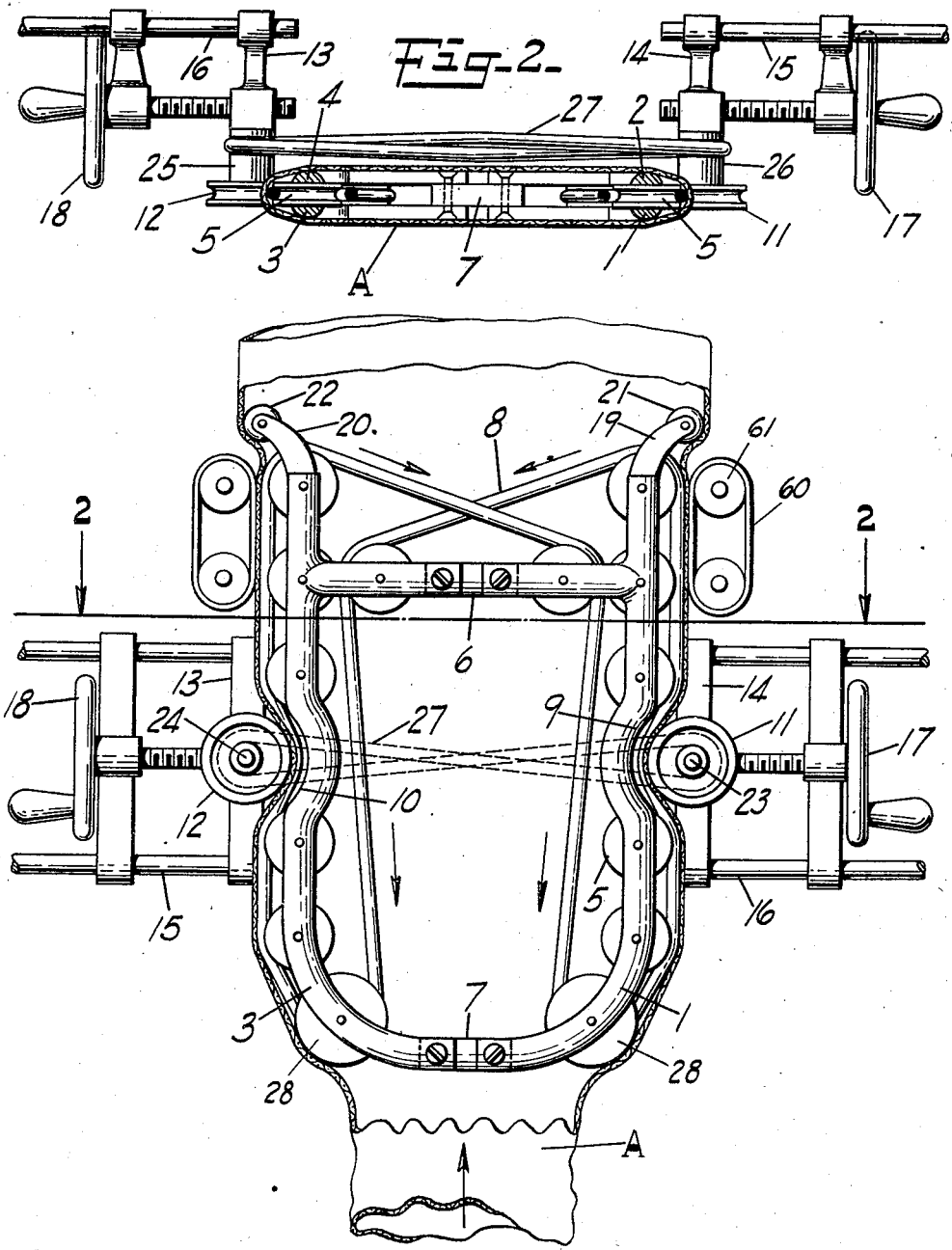
INVENTOR.
FREDERICK C. WEDLER
BY Thomas R. O'Nally
ATTORNEY

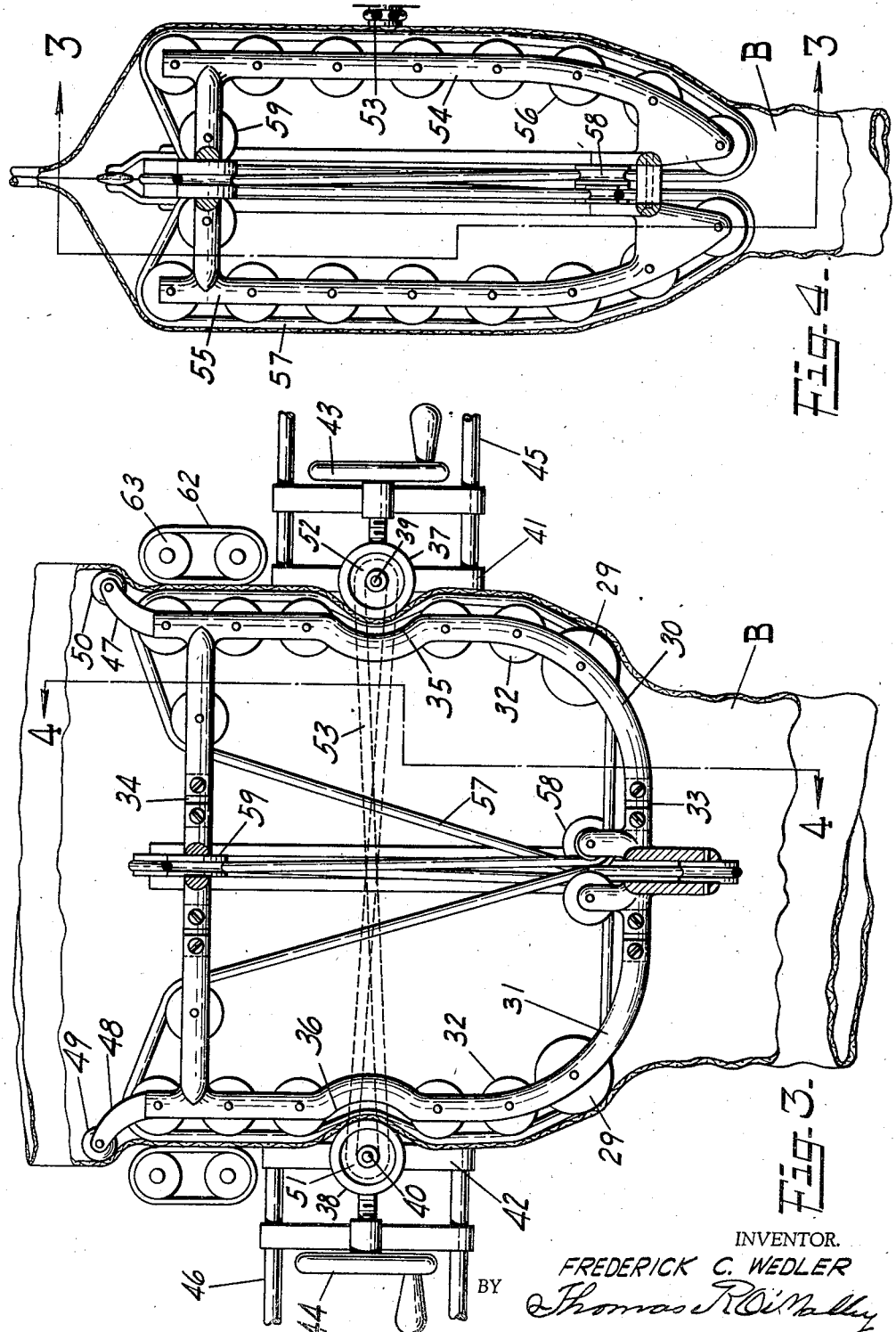

Patented Sept. 1, 1942

2,294,642

UNITED STATES PATENT OFFICE 2,294,642

APPARATUS FOR SPREADING AND STRETCHING FABRICS IN TUBULAR FORM

Frederick Charles Wedler, Media, Pa., assignor to American Viscose Corporation, Wilmington, Del., a corporation of Delaware Application May 20, 1941, Serial No. 394,268

2 Claims. (Cl. 26—55)

This invention relates to an apparatus for spreading and stretching fabrics in tubular form. More particularly the invention relates to an apparatus for uniformly spreading and stretching fabrics which are processed and finished in the tubular form.

Various types of apparatus have been previously suggested for spreading and stretching fabric in tubular form. However it was found that they did not feed the fabric uniformly and as a result the spreading or stretching of the fabric was not uniform.

This invention has for its principal object to provide an apparatus for uniformly spreading and stretching fabric in tubular form.

Another object of the invention is to provide an apparatus for feeding and uniformly spreading and stretching fabric in tubular form.

Other objects and advantages of the invention will be apparent from the following description and accompanying drawings.

In the drawings

Figure 1 is an elevational view of an embodiment of the invention with parts broken away.

Figure 2 is a sectional view on the line 2—2 in Figure 1.

Figure 3 is a sectional view of another embodiment of the invention on the line 3—3 in Figure 4 with parts broken away.

Figure 4 is a sectional view on the line 4—4 in Figure 3 with parts broken away.

The spreader shown in Figures 1 and 2 of the drawings comprises the spaced apart frame members 1, 2, 3 and 4 between which a plurality of grooved pulleys 5 and 28 are pivotally mounted. The frame members are secured to the spacer members 6 and 7 which may be replaced by spacer members of a different size so that the width of the spreader may be adjusted. A continuous belt 8 of elastic material is passed along the outer sides of the frame members over the pulley members and crosses on itself between the frame members. The grooves in the pulley members 5 are of less depth than the thickness of the belt so that the belt extends beyond their periphery. The pulley members 28 are of larger diameter than the pulley members 5 and the grooves are deeper than the thickness of the belt so that the belt does not extend beyond their periphery and their peripheral speed is greater than that of the pulleys 5 and the belt member. The frame members have indented or recessed portions 9 and 10 to accommodate the grooved supporting pulleys 11 and 12. The supporting pulleys are fixed to the freely revolvable shafts 23 and 24 carried by the blocks 13 and 14 slidably supported on the standards 15 and 16. The position of the supporting pulleys relative to the spreader may be adjusted by the screw members 17 and 18 attached to the standards. The frame members are provided with means for further spreading and stretching the fabric in tubular form comprising the outwardly extending members 19 and 20 carrying at their outer ends the rollers 21 and 22. The members 19 and 20 and the rollers are of less thickness than the frame members. Grooved pulleys 25 and 26 are attached to the shafts 23 and 24 spaced from the supporting pulleys 11 and 12. The belt member 27 passes over the pulley members 25 and 26 and crosses on itself. Means are provided for drawing the fabric over the spreader comprising the belt members 60 passing over the pulley members 61 at each side of the spreader in contact with the fabric. The pulleys are driven by suitable means which are not shown.

In the operation of this embodiment of the invention fabric in tubular form A is drawn over the spreader in the direction shown by the arrow. The supporting pulleys are then moved inwardly to engage through the fabric, the belt member passing along the sides of the spreader, and the fabric is then continued to be drawn over the spreader. As the pulley members at the end of the spreader over which the fabric is first drawn move at a greater speed than the belt member, the fabric is relatively slack when it contacts the belt member. This enables the fabric to adjust itself on the spreader without distortion or straining. Due to the friction of the fabric on the portions of the belt member passing along the sides of the spreader, the belt member will be moved with the fabric. As the belt is a continuous member the portions of the belt along the sides of the spreader will move at the same speed and in the same direction. The supporting pulleys will rotate at the same speed because of the belt passing around the other pulleys on the supporting pulley shafts which will further insure both sides of the fabric passing over the spreader at a uniform rate. From this it can be seen that any tendency for portions of the tubular fabric to move at a different rate than others, which results in distortion of the fabric, will be eliminated.

The spreader shown in Figures 3 and 4 of the drawings comprises the pairs of spaced apart frame members 30 and 31 between which the plurality of grooved pulleys 29 and 32 are pivotally mounted. The frame members are secured to the spacer members 33 and 34 which may be replaced by spacer members of a different size so that the width of the spreader may be adjusted. The frame members have indented or recessed portions 35 and 36 to accommodate the grooved supporting pulleys 37 and 38. The supporting pulleys are fixed to the freely revolvable shafts 39 and 40 carried by the blocks 41 and 42 slidably supported on the standards 45 and 46. The position of the supporting pulleys may be adjusted by the screw members 43 and 44 attached to the standards. The frame members are provided with means for further spreading and stretching the fabric in tubular form comprising the outwardly extending members 47 and 48 carrying at their outer ends the rollers 49 and 50. The outwardly extending members and the rollers are of less thickness than the frame members. Grooved pulley members 51 and 52 are attached to the shafts 39 and 40 and are spaced from the supporting pulleys. The belt member 53 passes over the pulley members 51 and 52 and crosses on itself. These parts of the apparatus are substantially the same as the corresponding parts of the apparatus shown in Figures 1 and 2 and described above. Additional means are provided in this apparatus for insuring a uniform feed of the fabric in tubular form. These means comprise the pairs of spaced apart frame members 54 and 55 arranged in a plane at right angles to the frame members 30 and 31 between which the plurality of grooved pulley members 56 are pivotally mounted. The continuous belt member 57 is directed by the sets of pulleys 58 and 59 to the plurality of pulleys 29, 32 and 56 carried by the frame members which form the sides of the spreader. The grooves in the pulley members 32 and 56 are of less depth than the thickness of the belt so that the belt extends beyond their periphery. The pulley members 29 are of larger diameter than the pulley members 32 and the grooves are deeper than the thickness of the belt so that the belt does not extend beyond their periphery and their peripheral speed is greater than that of the pulleys 32 and the belt member. Means are provided for drawing the fabric over the spreader comprising the belt members 62 passing over the pulley members 63 at each side of the spreader in contact with the fabric. The pulleys are driven by suitable means which are not shown.

The operation of this form of apparatus is substantially the same as the operation of the form of apparatus shown in Figures 1 and 2. The additional spreaders and pulley members permit the belt member to contact the fabric in tubular form B in more places which assists the fabric being fed at a uniform rate. The spreader members also spread the fabric outwardly in directions lying in transverse planes.

The forms of apparatus shown spread and stretch the fabric in successive stages. As the fabric passes over the frame members it is spread open and stretched and in passing over the rollers carried by the outwardly extending members at the ends of the frame members, is subjected to further spreading and stretching. The outwardly extending members and rollers carried thereby are of less thickness than the frame members and serve to flatten the fabric in addition to spreading and stretching it.

While preferred embodiments of the invention have been shown, it is understood that changes and variations may be made without departing from the spirit and scope of the invention as defined by the appended claims.

What I claim is:

1. An apparatus for spreading tubular fabric comprising frame members having at one end outwardly extending portions of reduced thickness and at the other end inwardly extending portions, a plurality of grooved pulley members revolvably mounted on the frame members, a belt member passing over the pulley members and extending beyond the periphery thereof along the outer sides of the frame member, pulley members revolvably mounted on the frame members adjacent the inwardly extending portions, said latter pulleys being of greater diameter than the other pulley members and being grooved deeper than the thickness of the belt member.

2. An apparatus for spreading tubular fabric comprising frame members having at one end outwardly extending portions of reduced thickness and at the other end inwardly extending portions, a plurality of grooved pulley members revolvably mounted on the frame members, a belt member passing over the pulley members and extending beyond the periphery thereof along the outer sides of the frame member, pulley members revolvably mounted on the frame members adjacent the inwardly extending portions, said latter pulleys being of greater diameter than the other pulley members and being grooved deeper than the thickness of the belt member, said frame members having recessed portions, means for supporting the apparatus comprising pulley members adapted to engage the belt member adjacent the recessed portions, means controlling the rotation of the supporting pulleys causing them to rotate at the same speed comprising a continuous belt member and belt-like means positioned adjacent the frame members and spaced from the supporting pulleys for drawing fabric over the frame members.

FREDERICK CHARLES WEDLER.